United States Patent [19]

Arai

[11] Patent Number: 5,028,008
[45] Date of Patent: Jul. 2, 1991

[54] SMALL-SIZED FLUID TREATMENT ELEMENT

[75] Inventor: Koichi Arai, Kanagawa, Japan

[73] Assignee: Arai Machinery Corporation, Kanagawa, Japan

[21] Appl. No.: 394,863

[22] Filed: Aug. 17, 1989

Related U.S. Application Data

[63] Continuation of Ser. No. 175,948, Mar. 31, 1988, abandoned.

[30] Foreign Application Priority Data

Aug. 2, 1988 [JP] Japan .................................. 63-25734

[51] Int. Cl.⁵ .............................................. B01D 27/06
[52] U.S. Cl. ................................... 239/597; 210/497.1
[58] Field of Search ........................ 239/568, 597, 600; 166/231; 210/497.1; 29/165.7, 165.8

[56] References Cited

U.S. PATENT DOCUMENTS

| 1,246,355 | 11/1917 | Thomas | 239/597 X |
| 2,682,309 | 6/1954 | Banchback | 166/231 |
| 3,692,607 | 9/1972 | Shobert | 166/231 X |
| 4,088,580 | 5/1972 | Spurlock | 166/231 X |
| 4,170,626 | 10/1979 | Cuther et al. | 239/597 X |
| 4,655,922 | 4/1987 | Arai | 166/231 X |
| 4,742,872 | 5/1988 | Geske | 166/231 |

FOREIGN PATENT DOCUMENTS 861559 9/1981 U.S.S.R. .............................. 166/231

Primary Examiner—Andres Kashnikow
Assistant Examiner—Kevin P. Weldon
Attorney, Agent, or Firm—Morrison Law Firm

[57] ABSTRACT

A wire with a definite cross-section is previously wound and bent in the form of a coil in a desired diameter to form a cylindrical body provided with slit holes in the form of a coil on the adjoining wound portions. One open end of the cylindrical body as obstructed as much or through in the intermediary of a core bar having a fluid passage, while the other open end thereof is secured to a hole-opening base whereby a small-sized fluid treatment element is obtained.

5 Claims, 2 Drawing Sheets

4a: Central notched hole

SMALL-SIZED FLUID TREATMENT ELEMENT

This application is a continuation of U.S. patent application Ser. No. 07/175,948, filed 3/31,88, now abandoned.

BACKGROUND OF THE INVENTION

1. Field of the Invention

The present invention relates to a small-sized, highly precise fluid treatment element which is widely applicable to filters and nozzles for filtering and spraying various fluids.

2. Description of the Prior Art

Entirely cylindrical filters and nozzles in which wires in definite forms with triangular or cylindrical cross-sections are precisely wound around the surfaces of cylindrical bodies at a definite pitch to form helical slit holes are well known.

However, conventional filters or nozzles off this type which cannot be obtained unless a wire is precisely wound around the outer surface of a cylindrical body to operate provides poor productivity and takes much time which accompanies difficulty to reduce costs.

There is a problem in that the reduced winding diameter of the cylindrical body has deteriorated operability for being incapable of permitting low-cost mass-production.

SUMMARY OF THE INVENTION

The present invention is practiced in view of the above problem A wire with a definite cross-section is previously wound and bent in the form of a coil in a desired diameter to form a cylindrical body provided with slit holes in the form of a coil on the adjoining wound portions. One open end of the cylindrical body as obstructed as much or through in the intermediary of a core bar having a fluid passage, while the other open end thereof is secured to a hole-opening base whereby a small-sized fluid treatment element is obtained and a very small-sized, highly precise element can simultaneously be provided efficiently and at a low-cost.

Because the cylindrical body can be obtained by previously winding a wire with a definite cross-section in a desired diameter in the form of a coil, the slit holes can be formed in a definite size thereof in the winding operation of the wire, whereby a highly precise, small-sized fluid treatment element is obtained by the cylindrical body which is wound and bent in the form of a coil with or without the core rod.

When a gas such as air or a fluid such as water as a fluid to be treated is fed into the slit holes from the outside of the cylindrical body, the filtered waste is removed as sort of a filter and the fluid passed through the slit holes can flow out from the communication holes of the base. In contrast, when a desired fluid is fed into the cylindrical body from the communication holes of the base, the fluid can flow outward through the slit holes such that the cylindrical body can act as a desired nozzle.

DETAILED DESCRIPTION OF PREFERRED EMBODIMENT

Embodiments in the present invention are described hereinafter with reference to the drawings.

Figure 1:
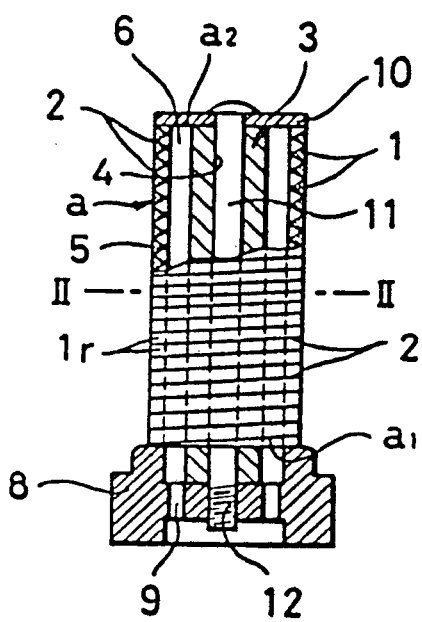
FIG. 1 is a partially cutaway side view illustrating one embodiments of a small-sized fluid treatment element in the present invention.

FIG. 1 illustrates a partially cutaway side view of one embodiment of the present invention.

Figure 6:
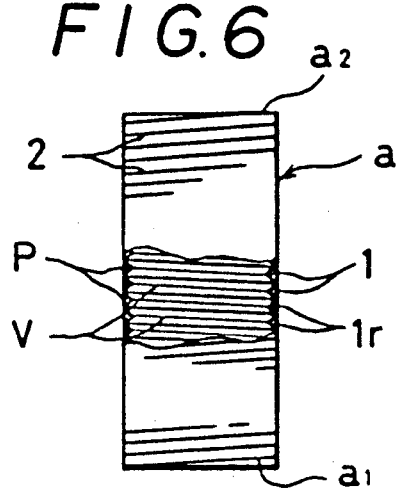
FIG. 6 is a partially cutaway side view of a cylindrical body obtained by winding in the form of a coil a wire in the present invention.
Figure 7:
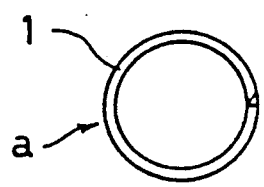
FIG. 7 is a plan view of the above.

In the drawing, a wire 1 with a triangular cross-section is previously wound and bent in the form of a wire with a definite diameter by placing on the inside thereof the sharp end V at the top of the triangle thereof and on the outside of the bottom, viz. a flat plane P to form a cylindrical boy a given in FIGS. 6 and 7. During the winding and bending operation of the cylindrical body a, the slit hole 2 of the adjoining wound portions 1r are formed in a desired size, such as a micron unit or a millimeter unit.

Figure 2:
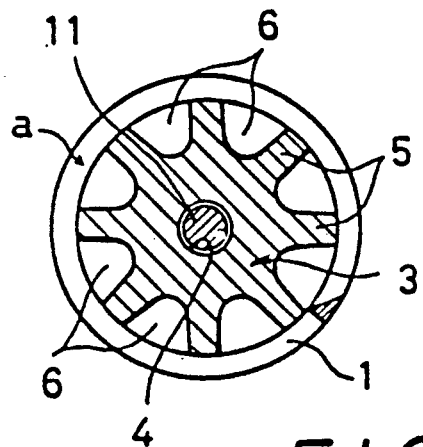
FIG. 2 is an enlarged sectional view along the lines II—II of the above.
Figure 3:
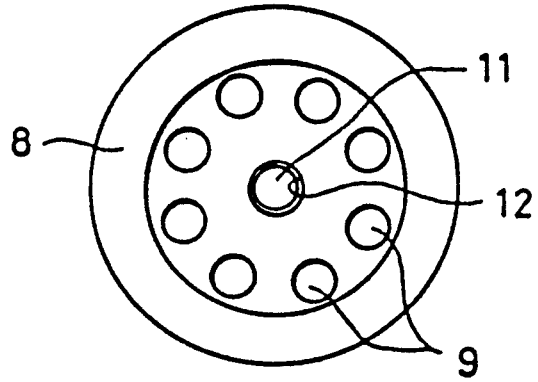
FIG. 3 is an enlarged bottom view of FIG. 1.
Figure 4:
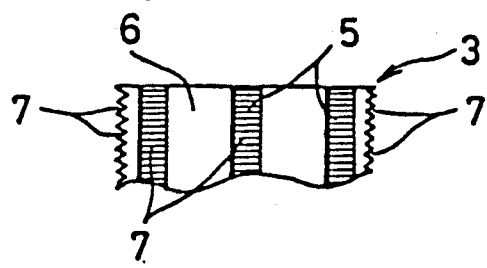
FIG. 4 is an enlarged side view of core rod alone.
Figure 5:
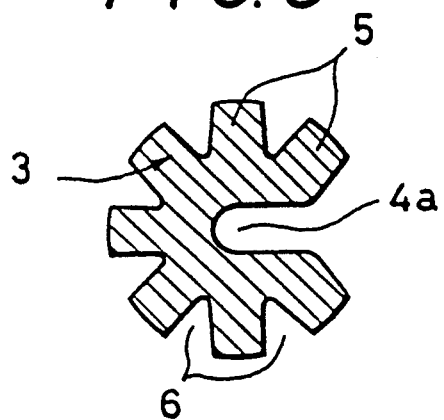
FIG. 5 is a cross-sectional view illustrating another shape of the core rod.

A core rod 3 for winding the cylindrical body a is pierced through a center hole 4 as illustrated in FIG. 2 and provides a number of projections 5 on the outer periphery thereof to form a groove-shaped fluid passage 6 between the adjoining projections 5 as shown in FIG. 2 or to form the center hole as a central notched hole 4a in communication with the outside with regard to the projections 5 and the fluid passage 6 as shown in FIG. 5. The core rods 3 in both cases are provided with engaging grooves 7 on the outer peripheries of the projections 5, as illustrated in FIG. 4, the engaging grooves which are in engagement with the coiled wire 1 of the cylindrical body a to be capable of accurately holding the gaps between the slit holes 2. A base 8 in which a number of passing holes 9 are bored is so constructed that it can retain the open end $a_1$ at the lower portion of the cylindrical body a and lock the lower end of the core rod 3. A cover 10 for supporting and obstructing the open end $a_2$ at the upper portion of the cylindrical body a is pierced through the center hole 4 or the central notched hole 4a of the core rod 3 by means of a stop rod 11 such as a screw for enabling threadly engaging a threaded hole 12 at the center of the base 8. In such a way, the fluid passage portion 6 of the core rod 3 can be in communication with the passing hole 9.

Because of the above structure, a desired fluid acted from the outer periphery of the cylindrical body is filtered from the slit holes 2 in the form of a coil and the filtered waste is left behind the outer periphery of the cylindrical body a to be removed.

The fluid passed through the slit holes 2 descends along the core rod 3 through the fluid passage 6 of the core rod 3 and the liquid is removed via the passing hole 9 of the base 8. On the contrary, the liquid that flows into from the passing hole 9 of the base 8 ascends along the fluid passage portion 6 The liquid is then filtered between the adjoining wound portions of 1r of the wire 1, sufficiently pressurized and subsequently delivered externally from the slit holes 2, such that the cylindrical body can be used as so-called nozzles The direction of the acting force exerted on the cylindrical body a is thus used either forward or backward according to the kind and usage of the liquid whereby the cylindrical body a can perform multi-purpose liquid treatment such as filtering and separation of the liquid and as nozzles.

Figure 8:
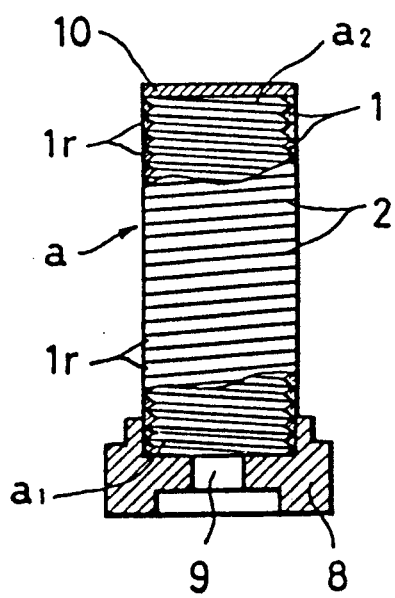
FIGS. 8 and 9 are partially cutaway side views illustrating other embodiments in the present invention, respectively.

The second embodiment of the present invention is described below with reference to FIG. 8.

The embodiment is characterized in that the cylindrical body a in the first embodiment is constructed without using any core rod. The embodiment is constituted only of a cover 10 fixedly attached to upper open end $a_2$ of the cylindrical body a and the lower open end $a_1$ is directly fixedly attached to the base 8. The embodiment is effective when the fluid to be treated is of low viscosity and the pressure of the liquid is low.

Other structures and actions are the same as those in the first embodiment with the description thereof being omitted.

Figure 9:
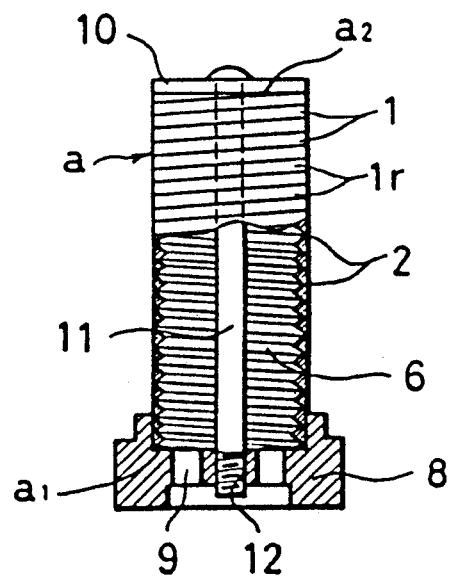

The third embodiment is described below with reference to FIG. 9. All the structures of the embodiment are the same as those in the above embodiments with the only exception of a stop rod 11 added to the structure of the second embodiment.

The third embodiment has an advantage in that the stop rod 11 avoids the longitudinal deformation of a wire 1 in the form of a coil to ensure the precision of the slit holes 2 when the fluid to be treated has high fluid pressure and is viscous.

Although these embodiments are described above for the present invention, the wire can be formed in any preferred shape such as a circle, a trapezoid, or an ellipse when the wire 1 constituting the cylindrical body a has a definite shape of the cross-section Accordingly, the engaging groove 7 is preferably perforated in a form identical to the cross-sectional form of the wire 1 when the core rod 3 is used In the above embodiments, the cover 10 is connected to the cylindrical body a in such a manner that a cap-like cover, in addition to the cover 10 illustrated in the drawings, formed by providing a downward brim on the peripheral margin of the cover 10 is merely fitted to the cylindrical body (not shown) and joined thereto by welding. There is no restriction of the method for connecting the cover 10 thereto.

The above embodiments may also be applied to a fluid in which dusts and particulates are blended with air.

The wire 1 may use desirable materials such as plastics and ceramics

According to the present invention, the cylindrical body provided with the slit holes can be produced continuously with enhanced precision of the slit holes by previously winding and bending the wire with a definite cross-sectional form For this reason, the cylindrical body is suited for mass-production at low cost and very suitable for small-sized fluid treatment elements.

It can widely be employed in multi-purpose fluid treatment by switching the flow direction of the fluid to be treated either forward or backward with respect to the cylindrical body.

What is claimed is:

1. A fluid treatment element useable as a filter, a nozzle or the like, said fluid treatment element comprising an elongated core bar including a plurality of circularly spaced, longitudinally disposed projections, the projections extending radially from a thick core bar central part, adjacent ones of the projections being intervened by spaces longitudinally coextensive with the projections, the projections each having a longitudinal succession of transverse grooves at the radial periphery thereof, a cylindrical wire coil body encircling the core bar, the coil body windings and said core bar longitudinal spaces defining fluid flow passages, the coil body comprising a succession of wire windings, successive individual ones of the wire windings being closely received in successive individual ones of the transverse grooves of the projections with adjoining windings defining slit holes of predetermined dimension therebetween, an obstruction disc covering an end of the element to obstruct the fluid flow passages, a base member covering the opposite end of said element, said base member having through holes therein, said holes communicating with said fluid flow passages, and means for holding said obstruction disc and said base member securely against the opposite ends of said element, fluid flow when the element is used being entering through the slit holes into the fluid flow passages and outwardly therefrom through the base member holes, or flowing in the opposite direction.

2. The fluid treatment element of claim 1 wherein said core bar central part includes a longitudinal through bore therein, and said holding means includes a rod passing through said bore.

3. The fluid treatment element of claim 2, wherein:

said obstruction disc is a flat circular member having an opening in its center;

said base member having a centrally located threaded hole;

said rod passing through said obstruction disc in the center opening thereof and said core, the rod including a thread portion received in said base member threaded hole.

4. The fluid treatment element of claim 1, wherein the wire of said coil body has a triangular cross-section;

said coil including sharp V ends of said triangular cross-section pointing toward the center of said coil;

a top of said triangle facing outward to form a flat outer cylindrical surface.

5. The fluid treatment element of claim 1 wherein each through hole in the base member aligns with a corresponding one of the fluid flow passages.

* * * * *